Patented May 22, 1951

2,554,459

UNITED STATES PATENT OFFICE 2,554,459

ETHYLENE OXIDE PROCESS AND CATALYST THEREFOR

Rudolph L. Heider, Dayton, Ohio, assignor to Monsanto Chemical Company, St. Louis, Mo., a corporation of Delaware No Drawing. Application March 20, 1948, Serial No. 16,140

3 Claims. (Cl. 260—348.5)

This invention relates to the manufacture of ethylene oxide, and more particularly to the process of producing ethylene oxide by the catalytic oxidation of ethylene in contact with the combination catalyst of silver deposited upon beryllium oxide.

An object of the invention is the production of ethylene oxide by catalytic oxidation of technical gas mixtures, particularly in processes in which temperature surges may occur. Another object is the provision of a catalyst which obviates the necessity for long and careful aging, or low temperature operation during reduction which has been characteristic of the catalysts of the prior art. Still another object of the invention is the provision of a silver bearing catalytic material which includes a carrier composed of beryllium oxide particles suitable for the catalytic oxidation of ethylene to ethylene oxide. Other objects will appear hereinafter.

The catalytic oxidation of ethylene for the production of ethylene oxide has been widely investigated and it has been found that while silver or silver oxide is a catalyst for the reaction, the efficiency of this oxidation is determined largely by the nature of the catalyst carrier upon which the silver is supported or deposited. Catalyst carriers employed in the prior art include pumice, carbon, silica, zeolite, kieselguhr, alundum, corundum, etc. Some of these carriers, for example, zeolite give only very low conversions per pass.

The silica carriers are also subject to various disadvantages. For example, silver on silica gel tends to develop hot spots during the reaction so that carriers employing this material are soon deactivated and become worthless as a catalytic support. The silver may also become catalytically ineffective by reason of a reaction with the silica to form silver silicates. Some forms of silica also exhibit a further disadvantage because they promote a combustion reaction forming $CO_2$, which must be mitigated by means of surface blanketing materials or promoters, such as barium and calcium peroxides and other salts. These, however, are only partly effective in reducing the activity of these silica carriers and it is found that the silica maintains its directive influence towards complete combustion without the formation of high yields of ethylene oxide which are desirable.

The alumina class of materials, such as carriers based upon alundum or corundum, when employed in combination with silver give good conversions to ethylene oxide, but their initial high activity requires the use of very low concentrations of ethylene in the gas mixture which is subjected to these catalysts. Thus, while the conversions obtained with these alumina catalysts are good, the output of ethylene oxide is low. Another disadvantage of the alumina carriers is that the silver salts on the surface of these materials must be reduced at a very low temperature, such as temperatures of approximately 150° C. for the reductions which are necessary to maintain the activity of a catalyst.

The necessity for low temperature reduction is described in U. S. Patent No. 2,142,948. Here the reduction of silver upon an aluminous carrier was carried out first at 250° C., and all subsequent reductions were carried out at 150° C., whereas the ethylene oxide reaction itself was carried out at 290° C. to 295° C.

It is recognized by those skilled in the art that lower reduction temperatures are necessary with the conventional alumina based carriers if an active silver catalyst is to be produced. In obtaining an active form, however, the resultant silver crystallites are very small and display poor wetting with resultant poor adherence to the alumina carrier. The beryllia carrier, in contrast to alumina and silica carriers, appears to be more thoroughly wetted by the deposited silver film. For this reason the silver is held more tenaciously, so that it is not readily flaked or sloughed off by erosion of the gas stream in the operation of the ethylene oxide process.

It has been found by microscopic examination of catalyst samples that the low temperature reduced silver formed upon such alumina carriers exists in a very finely divided state. When such low temperature reduced silver-alumina catalysts are used for ethylene oxide production at conventional temperatures, it has been found that the micro-crystallites of silver gradually increase in effective size during use, and that the crystallites eventually reach a large size. This growth of the silver crystallite is further accentuated when hot spots develop during normal operation as by variations in process conditions. As a direct result of such crystal growth the extensive surface area necessary to utilize the silver as a catalyst is lost. Consequently, an alumina base catalyst which has once been overheated is worthless for future catalytic operations, because of its greatly lowered activity. The alumina carriers for silver catalysts are, therefore, characterized by poor stability with regard to variable temperature, since such catalysts must be reduced at a low temperature and must always be maintained at a relatively low temperature which is free from thermal fluctuation.

It has now been found that the combination of silver upon fused beryllium oxide provides an extremely rugged catalyst which obviates the prior art requirements of low temperature reduction, and which can withstand high temperature surges.

The new catalyst may also be employed in an ethylene oxide process operating at considerably higher catalyst temperatures than was possible in the past. Since this catalyst is less subject to crystallite growth of the deposited silver, it is far safer as a commercial catalyst, since it can withstand temperature fluctuations and local overheating such as may occur, for example, in the burning of carbon particles resulting from the presence of traces of acetylene in the feed gases.

It has been conventional in the prior art operations utilizing silica or alumina based carriers to employ inhibitors or repressants in ethylene oxide production. For example, as shown in Patent No. 2,279,470 control of the complete combustion to carbon dioxide has been attempted by the addition of various compounds to mitigate such undesired reactions. However, the present silver-beryllium oxide catalyst, because of greater heat-stability, is not as prone to require inhibitors or repressants, since this catalyst is not subject to the deleterious effects caused by sudden temperature surges.

Because of the temperature stability of the fused beryllium oxide carrier in combination with silver, it is possible to employ not only pure ethylene for ethylene oxide production, but to utilize commercial gas mixtures as well, including leaner ethylene concentrations than were heretofore possible, for example, 90% or lower purity in the hydrocarbon feed stream. Thus, in addition to the possible contaminants, such as acetylene, which may result from the use of by-product ethylene obtained in acetylene production by high temperature combustion, gases obtained in petroleum cracking operations may be employed. Such still release gases, for example, as those containing ethylene, other gaseous olefins, and paraffins, as well as acetylenes may be utilized for the production of ethylene oxide by the catalytic oxidation of the ethylene contained in such gas mixture by my present invention. While Lenher in U. S. Patent No. 1,995,991 suggests that he may oxidize a mixture of hydrocarbons or a gas containing an olefin hydrocarbon (page 3, col. 2, lines 61–63), the process employed by him is non-catalytic and results in the production of more aldehyde than ethylene oxide. I have found that when a mixture of air with paraffinic hydrocarbons containing ethylene is passed over conventional silica or alumina based catalysts which were known to give conversions of pure ethylene to ethylene oxide, there occurs so rapid an oxidization of the paraffinic constituents of the mixture that overheating of the catalysts, resulting in deterioration of the same, always takes place. The use of gaseous hydrocarbon mixtures containing paraffinic hydrocarbons, as well as the acetylenic hydrocarbons such as may occur in high temperature hydrocarbon processing, is, of course, preferable from an economic standpoint to the use of pure ethylene. The new catalyst and the process employing the same herein provided obviates the necessity for purifying the ethylene previous to the oxidation step so that the objective of the production of ethylene oxide from such cheap and readily available gas mixtures may be realized.

The beryllium oxide may be employed in any desired form or condition. Granules of the oxide are convenient for disposal in catalytic converters. A preferred embodiment is the use of beryllium oxide in fused form. This state of the oxide is very stable and resistant against degradation by the gas stream which is passed through the catalyst bed at a high velocity during the catalytic reaction. The fused beryllium oxide may be utilized in the form of fine particles or as a relatively coarse aggregate, dependent upon the particular types of reactors which may be used and upon the allowable pressure drop. It is an advantage of the beryllium oxide that the ruggedness of this material prevents the breakdown or powdering of the particles so that the initial particle size is substantially maintained throughout the life of the material in the catalytic converter. Consequently, the pressure drop does not change greatly during the life of the catalyst, since the initial particles are themselves maintained intact without degradation, and the deposited silver is also held with extreme tenacity without the production of silver globules upon the surface. The beryllium oxide is preferably employed as the sole carrier of the silver catalytic material, but mixtures of beryllium oxide with other carriers may be employed. However, the percentage of beryllium oxide as an essential constituent in the carrier must be maintained sufficiently high so that the characteristic qualities such as high temperature stability, adherence of silver and high initial ethylene feed concentration remain substantially unaffected.

The combination of the fused beryllium oxide with silver may be accomplished by impregnating or admixing with any convenient silver salt. The beryllium oxide particles may be slurried with the silver salt or may be impregnated therein. Alternatively a slurry of finely divided metallic silver or silver oxide particles may also be applied to the beryllium oxide carrier.

After the silver has been deposited or impregnated upon the carrier as metal or salt, the catalytic material is dried and may be reduced before charging to the reactor, or may be reduced in situ in the reactor.

The reduced silver material, which in association with the beryllium oxide carrier is the active constituent in the ethylene oxide process, is probably metallic silver, but may be silver oxide, and may also include variable proportions of silver oxide. The total silver content may vary from 5% to 25% referred to the carrier.

The reduction process employing beryllium oxide as a base may be carried out at far higher temperatures than has been possible with prior art materials. Thus, silver nitrate impregnated upon beryllium oxide may be reduced at about 275° C. to 300° C. without the danger of fusion of the silver on the catalyst surface. With silver nitrate deposited upon alumina in the same manner, it is found that the temperature must be held about 100° C. lower than in the case of beryllium oxide.

The catalytic operation employing the silver-beryllium oxide catalyst either in the presence or absence of other gaseous hydrocarbons may be carried out at temperatures of from 225° C. to 350° C. and preferably at temperatures of about 250° C. to 300° C. A preferred embodiment is the operation of ethylene oxidation utilizing beryllium oxide at about 275° C. The oxidizing medium may be air or a mixture of oxygen and an inert gas, such as may result from oxygen enrichment. Oxidation may be economically carried out by a single pass operation, although, if desired, recycling of the exit gases (from which the ethylene oxide has been removed by absorption) may be used by constant addition of ethylene and air to the feed gases. By employing the present catalyst, from 70% to 80% of the ethylene originally present in the feed gas is consumed in one pass, from 40% to 45% and higher being converted to ethylene oxide and the remainder to other oxidation products, chiefly carbon dioxide. Thus, after absorption of the ethylene oxide the resulting gas mixture generally contains less than 1% of ethylene, the major proportion of this gas stream being carbon dioxide, oxygen and nitrogen. In a specific instance, for example, employing an initial gas mixture consisting of 3% by volume of ethylene and 97% by volume of air, 45% of the ethylene is converted into ethylene oxide and 30% into carbon dioxide.

In order to present the invention in greater detail several examples are set out below, although it is intended that the subject matter of the said examples shall be illustrative and not limitative of the present invention.

*Example 1*

Fused beryllium oxide in the form of 4 x 8 mesh particles was dried in a vessel immersed in a nitrate bath at 300° C. for one hour. During this time the vessel was evacuated by applying full water pump suction. After cooling the beryllium oxide, a water solution containing 25% by weight of silver nitrate was added to the carrier in such amount as to produce a carrier-silver nitrate containing 25% by weight of the latter salt based on the weight of the carrier. The mixture was allowed to soak overnight. The excess water was removed under vacuum by heating the carrier in the same vessel. The dried silver nitrate impregnated catalyst was then charged to a heated reactor and reduced with hydrogen at 275° C. to 300° C. for 5 hours.

*Example 2*

The utilization of the catalyst of Example 1 in an ethylene oxide process was carried out by charging the impregnated catalyst to the same stainless steel tube in which the reduction was carried out. The tube was surrounded with a constant temperature bath.

The reduced catalyst was operated in a recycle system. The make-up gas mixture of 7% ethylene and 93% air, was mixed with 4 parts of the recycle gas from which the ethylene oxide had previously been absorbed. The total mixture was then passed over the catalyst at a space velocity of 1300 R. H.

It was found that space velocities could be utilized at a far higher range than was possible with prior art catalysts which generally operated at about 500–700 reciprocal hours (R. H.). By the term "space velocity" expressed as reciprocal hours (R. H.) I mean the number of volumes of gas measured at standard conditions (0° C./760 mm.) per hour passing over a unit volume of catalyst. The thermal stability of the beryllium oxide in avoiding hot spots, together with its quality of holding the deposited silver, apparently allowed the use of far higher velocity gas streams without permitting the hot spots to reach the dangerous condition of a runaway reaction which might propagate a flame and fuse the catalyst.

I have found, moreover, that aside from the economic consideration of high throughput the space velocity can be considerably varied, depending upon other factors entering into the operation, i. e., reaction temperature concentration of ethylene and air in the gas mixture proportion of beryllia used in the catalyst, etc. Generally the space velocity required for good conversions to ethylene oxide varies from 500 to 3,000 R. H. While ordinarily a space velocity in the range of 1,000 to 1,500 R. H. will be employed, this value may be varied, particularly if a recycle system is contemplated.

The operations in the present process were carried out utilizing a recycle ratio of 4:1. However, this recycle ratio may be varied considerably, depending upon the type of product which is desired, since it is possible when producing ethylene glycol directly from the exit gas stream to operate at considerably higher recycle ratios such as 8:1.

In the production of ethylene oxide as such, I prefer to employ low recycle ratios such as 2:1, and may also use a once-through process.

*Example 3*

A comparison was made of the present beryllium oxide in combination with silver as a catalyst relative to the results obtained in another experiment made with the use of a silver on silica. This catalyst consisted of 23% silver deposited on 4 x 8 mesh silica particles. This catalyst was employed with a gas mixture consisting of 3% of ethylene and 97% of air by volume. The temperature of the bath surrounding the catalyst tube was maintained at about 244° C., which was as high as the temperature could safely be brought for continuous operation. During the first 2.5 days the temperature of the catalyst bed rose from 266° C. to 349° C. and the per cent conversion of introduced ethylene reacting to form ethylene oxide fell from 38.1% to 26.7%. The ethylene and air flows were 2.0 and 65.0 liters per hour, respectively, corresponding to a space velocity of 650 R. H.

*Example 4*

In another test which was made to compare the alumina based silver catalyst, there was used a tabular corundum catalyst containing 10% by weight of silver. A 3% ethylene—97% air mixture for a space velocity of 264 R. H. gave conversions varying from 28.6% to 16.2% at temperatures as measured in the catalyst bed of from 208° C. to 360° C. The use of higher space velocities gave lower conversions; the conversion of introduced ethylene to ethylene oxide at a space velocity of 1100 R. H. and the catalyst bed temperatures of from 310° C. to 364° C. varied from 8.8% to 13.9%.

In the operation of the present process it was found that no preliminary aging of the catalyst is necessary, and that the operating temperature may be increased to a considerably higher temperature than was previously possible by reason of the greater thermal stability of the catalyst. This thermal stability is attributable to the nature of the combination of silver with beryllium oxide, since the present catalyst combination is considerably less susceptible to surface fusion of the catalytic silver present on the beryllia. The present catalyst is consequently also uninfluenced by accidental temperature increases which are inevitable in any technical process of this nature. I have found that such accidental temperature increases which might raise the catalyst temperature to values exceeding 350° C. do not influence the conversion, although such occurrences are known to render an ordinary alumina catalyst unfit for further use.

The present process utilizing the catalyst of beryllium oxide in combination with silver was found under the above conditions to give conversions of 40% to 45% to ethylene oxide, and yields of 55% to 50% based upon the ethylene consumed.

The above reaction was carried out at atmospheric pressure, although subsequent work has shown that the reaction proceeds equally well at pressures above or below atmospheric.

Recovery of the ethylene oxide may be effected by any of the methods known to the art, i. e., by absorption upon activated carbon or by solution in water or other solvents. Preferably, the reaction gases are passed through a scrubbing tower wherein the ethylene oxide-containing gases are thoroughly contacted with water or other solvents, and the ethylene oxide dissolved therein for further processing.

The present combination catalyst of silver deposited upon beryllium oxide is particularly advantageous in large scale processes for the production of ethylene oxide. In a commercial unit it is highly advantageous to employ the same converter for the reduction of the catalyst and for the oxidation step, particularly if both operations are performed at the same converter temperature.

The requirement of reducing alumina and silica supported silver catalyst at low temperatures in order to obtain the desired activity necessitates the added capital expenditure of another converter for the sole purpose of preparing catalyst. The present silver-beryllium oxide catalyst avoids these difficulties since it may be reduced at the normal operating temperature without losing its activity.

It has been observed that the beryllia-silver combination catalyst permits the use of higher concentrations of ethylene such as 5% ethylene in air in the incoming gas. It has been a characteristic of the prior art alumina-silver catalyst that the ethylene concentration had to be kept at a low value, particularly during the initial break-in operations, and only slowly raised after many hours of operating time until the optimum ethylene concentration could be tolerated.

In contrast to this situation, the present beryllia-silver catalysts allow the higher ethylene feed gases to be used immediately after the reduction of the catalyst has been completed. Because of this gain in the ability to utilize high ethylene concentrations the present catalysts permit a process to be carried out in which gradual and constantly changing addition of ethylene need not be controlled manually.

Since many widely different embodiments of this invention may be made without departing from the spirit thereof, it is to be understood that I do not limit myself to the specific embodiments thereof except as defined in the appended claims.

What I claim as new and desire to secure by Letters Patent of the United States is:

1. The process for making ethylene oxide by the direct chemical combination of ethylene and oxygen on a silver catalyst which comprises passing ethylene and gases containing molecular oxygen at temperatures between 250° C. and 300° C. over a silver catalyst surface supported upon a carrier comprising fused beryllium oxide.

2. The process for making ethylene oxide by the direct chemical combination of ethylene and oxygen on a silver catalyst which comprises passing ethylene and gases containing molecular oxygen at temperatures between 225° C. and 350° C. over a silver catalyst supported upon a carrier comprising fused beryllium oxide.

3. The process for making ethylene oxide by the direct chemical combination of ethylene and oxygen on a silver catalyst which comprises passing ethylene and gases containing molecular oxygen at temperatures between 225° C. and 350° C. over a surface which includes an active catalytic material of the group consisting of silver oxide, silver, and mixtures thereof supported upon a carrier comprising fused beryllium oxide.

RUDOLPH L. HEIDER.

REFERENCES CITED

The following references are of record in the file of this patent:

UNITED STATES PATENTS

| Number | Name | Date |
|---|---|---|
| 2,307,421 | Overhoff | Jan. 5, 1943 |
| 2,354,892 | Thacker | Aug. 1, 1944 |
| 2,393,537 | Huttman | Jan. 22, 1946 |
| 2,424,083 | Finch et al. | July 15, 1947 |
| 2,424,084 | Finch et al. | July 15, 1947 |
| 2,430,443 | Becker | Nov. 11, 1947 |

OTHER REFERENCES

Bergman et al., Catalysis, page 697, 1940, Reinhold Publishing Corp., New York.